Jan. 9, 1923.  1,441,443.
J. W. MEADOWCROFT.
ELECTRODE CLAMPING DEVICE FOR ELECTRIC WELDING MACHINES.
FILED AUG. 16, 1921.
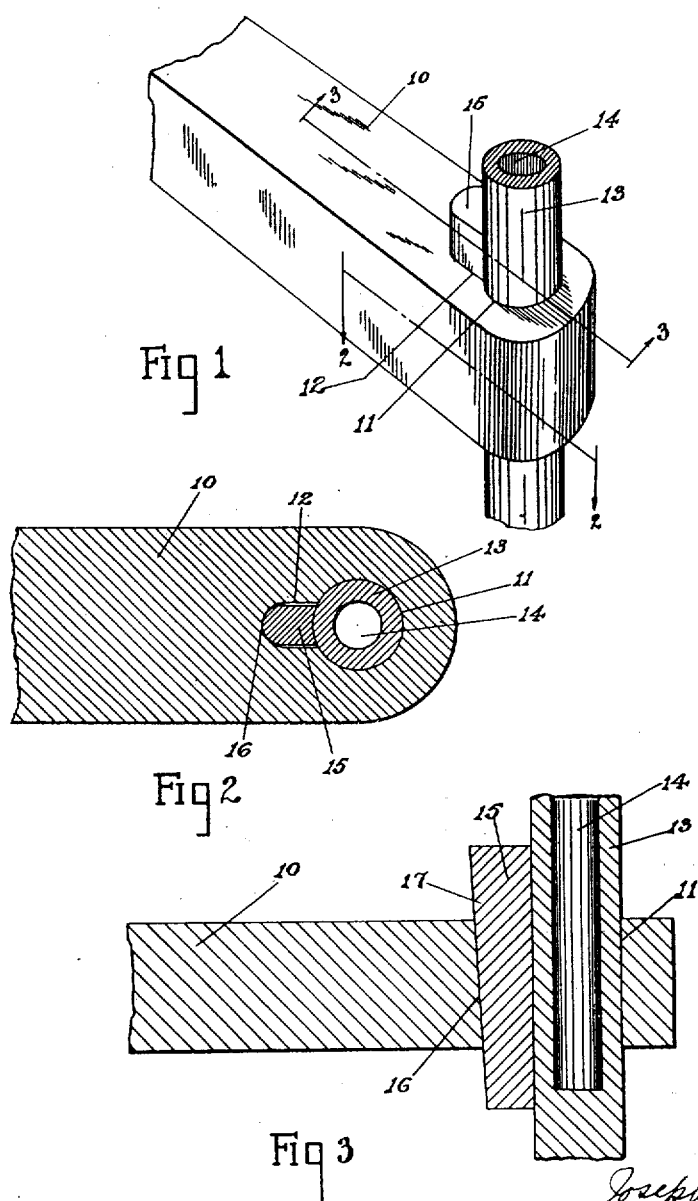
INVENTOR.
Joseph W. Meadowcroft
BY
C. B. Desjardins
ATTORNEY
Witness
Walter M. Trout Patented Jan. 9, 1923.

1,441,443

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRODE-CLAMPING DEVICE FOR ELECTRIC WELDING MACHINES.

Application filed August 16, 1921. Serial No. 492,697.

*To all whom it may concern:*

Be it known that I, JOSEPH W. MEADOWCROFT, a citizen of the United States, residing at Philadelphia, Pennsylvania, have invented certain new and useful Improvements in Electrode-Clamping Devices for Electric Welding Machines (Case C), of which I declare the following to be a full, clear, and exact description.

My invention relates to an improved device for releasably locking or clamping the electrodes used in electric welding machines. It relates, particularly, to a device for clamping the stationary electrode in position relative to the stationary arm of an electric spot-welding machine.

The stationary arm of an electric spot welder is usually made of copper so as to furnish a low resistance path for the welding current. Heretofore, it has been the practice to insert the electrode through a transverse opening in the arm and to clamp it in place by a set screw. This has proven objectionable because the workman, in loosening the electrode when adjusting or removing it, frequently pounds or hammers the end of the arm in order to start the electrode. This batters the soft copper arm and soon distorts it so that its life is very materially shortened.

The object of my invention is to provide a device for clamping the electrode which may be released or applied very easily and quickly and in which it is unnecessary to pound the end of the stationary supporting arm in order to release the electrode.

Further objects, and objects relating to economies and details of construction and operation, will definitely appear from the detailed description to follow. My invention is clearly defined and pointed out in the appended claims. A structure constituting one preferred embodiment of my invention is illustrated in the accompanying drawing, forming a part of this specification, in which—

Fig. 1 is a perspective view of the end of the stationary supporting arm of an electric welding machine, showing the electrode clamped in position by a device constructed in accordance with my invention.

Fig. 2 is a horizontal, sectional view, taken substantially on line 2—2 of Fig. 1, and Fig. 3 is a vertical, sectional view, taken substantially on line 3—3 of Fig. 1.

In the drawing, the same reference numerals refer to the same parts throughout the several views, and the sectional views are taken looking in the direction of the arrows at the ends of the section lines.

In general, my invention consists in providing a transverse opening or passage through the end of the stationary supporting arm of the welding machine, in which passage the electrode is mounted. The diameter of this passage is such, with respect to the diameter of the electrode, that the latter is free to slide in said passage but is held rigidly therein by wedge means acting on the electrode and forcing it against one wall of the passage, so as to clamp the electrode in adjusted position. This may be accomplished by providing a recess or opening extending through the arm of the welding machine and communicating with the opening or passage in which the electrode is positioned. The end wall of this recess may be inclined so as to cooperate with the inclined side of a wedge which may be forced into said recess between the end wall thereof and the electrode, so as to clamp the electrode against the side of the passage in which it is positioned.

I have illustrated in the drawing a structure which constitutes one embodiment of my invention and which comprises the arm, 10, of the welding machine provided with a cylindrical passage, 11, extending transversely through the end thereof. There is also provided a transverse recess or passage, 12, which communicates with the cylindrical passage, 11, for the electrode and which is of less width than the diameter of the cylindrical passage, 11. The end wall of the recess, 12, is inclined, as shown at 16, in Fig. 3, to constitute a wedge surface. The electrode, 13, provided with a water passage, 14, for cooling, is positioned in the cylindrical passage, 11, extending through the arm of the welding machine, and the diameter of this passage, 11, is slightly greater than that of the electrode, 13, so that the latter will slide freely in said passage except when it is held in adjusted position by the clamping means which I will now describe. A wedge, 15, is inserted in the transverse recess or passage, 12, and the inclined side, 17, of said wedge, engages the inclined end wall, 16, of the recess, 12.

When the wedge, 15, is removed, the electrode, 13, may be adjusted freely to any position desired. The workman holds the electrode in adjusted position and inserts the wedge, 15, in the recess, 12. One side of said wedge engages the electrode and the reaction between the inclined wedge surfaces, 16 and 17, as the wedge, 15, is moved longitudinally of the electrode in the recess, 12, forces the electrode against one side of the cylindrical passage, 11. A blow of a hammer or suitable tool on the upper end of the wedge will cause it to clamp the electrode, 13, rigidly in adjusted position. The electrode can be released very quickly by a blow on the lower end of the wedge, 15, which will drive the wedge at once from its clamping position. It will be noted that it is entirely unnecessary to strike or pound the end of the supporting arm in order to start the electrode from its clamped position and this clamping device not only affords a quick and easy release for the electrode but one which adds materially to the life of the supporting arm.

I am aware that the embodiment which I have shown and described may be varied considerably without departing from the spirit of my invention and, therefore, I desire to claim my invention broadly, as indicated by the appended claims.

Having thus described my invention, what I claim as new and desire to secure by Letters Patent, is:

1. An electrode clamping device for electric welding machines comprising an arm of said welding machine provided with a transverse passage therethrough, in which an electrode fits loosely and is movable freely, and wedge means acting on said electrode to clamp it rigidly against one wall of the passage.

2. An electrode clamping device for electric welding machines comprising an arm of the welding machine having a transverse passage therethrough, in which an electrode fits loosely and is movable freely, and a wedge movable longitudinally of said electrode and engaging said electrode to clamp it rigidly against one side of said passage.

3. An electrode clamping device for electric welding machines comprising an arm of the welding machine having a transverse passage therethrough, in which an electrode fits loosely and is movable, and a wedge acting on said electrode in said passage to clamp said electrode against the opposite wall of said passage.

4. An electrode clamping device for electric welding machines comprising an arm of the welding machine having a transverse passage therethrough, in which an electrode fits loosely so as to move freely therein, and a recess communicating with said passage, and a wedge disposed in said recess between a wall thereof and said electrode and acting to clamp said electrode against the opposite wall of said passage.

5. An electrode clamping device for electric welding machines comprising an arm of the welding machine having a transverse passage therethrough, in which an electrode fits loosely and moves freely, and a recess communicating with said passage, said recess having an inclined end wall, and a wedge extending through said recess and having an inclined surface cooperating with the inclined end wall of said recess and a surface engaging said electrode, said wedge being movable longitudinally of the electrode to clamp it against the side of said passage.

In testimony whereof, I affix my signature.

JOSEPH W. MEADOWCROFT.